(12) United States Patent
Miller et al.

(10) Patent No.: US 10,675,573 B2
(45) Date of Patent: Jun. 9, 2020

(54) REMOTE CONTROL FAUCET FILTER SYSTEM

(71) Applicant: CULLIGAN INTERNATIONAL COMPANY, Rosemont, IL (US)

(72) Inventors: Bryan Miller, Orland Park, IL (US); Kerry Quinn, Palatine, IL (US); Doug Anderson, St. Charles, IL (US); Zach Schroeck, Arlington Heights, IL (US)

(73) Assignee: CULLIGAN INTERNATIONAL COMPANY, Rosemont, IL (US)

(*) Notice: Subject to any disclaimer, the term of this patent is extended or adjusted under 35 U.S.C. 154(b) by 89 days.

(21) Appl. No.: 14/602,854

(22) Filed: Jan. 22, 2015

(65) Prior Publication Data
US 2016/0214041 A1    Jul. 28, 2016

(51) Int. Cl.
*B01D 35/04* (2006.01)
*B01D 35/147* (2006.01)
(Continued)

(52) U.S. Cl.
CPC ........... *B01D 35/04* (2013.01); *B01D 29/603* (2013.01); *B01D 35/143* (2013.01);
(Continued)

(58) Field of Classification Search
CPC .......... C02F 1/008; C02F 1/003; B01D 29/50; B01D 29/603; B01D 35/1573; B01D 35/04; B01D 35/143; B01D 35/147
(Continued)

(56) References Cited

U.S. PATENT DOCUMENTS

| 4,210,533 A | 7/1980 | Astl |
| 4,398,562 A | 8/1983 | Saarem et al. |

(Continued)

FOREIGN PATENT DOCUMENTS

| CN | 204569576 U | 8/2015 |
| CN | 204999636 U | 1/2016 |

(Continued)

OTHER PUBLICATIONS

Extended European Search Report from corresponding European Patent Application No. 15180775.7, dated Feb. 18, 2016.
(Continued)

*Primary Examiner* — Robert Clemente
*Assistant Examiner* — Akash K Varma
(74) *Attorney, Agent, or Firm* — Greer, Burns & Crain, Ltd.

(57) ABSTRACT

A faucet filter system is connected to a water supply line, and includes a manifold connectable to the supply line and providing selective fluid communication with the supply line and a filter apparatus in fluid communication with the manifold, at least one remote actuated valve is associated with the manifold and configured for controlling water flow in the manifold to the filter apparatus when filtered water is desired. A wireless controller is disposed remotely from the filter apparatus and the manifold and is configured for actuating the valve between a first position, in which water flows from the water supply conduit through a faucet inlet, and a second position, in which water flows from the water supply conduit, to the filter apparatus, through the filter outlet and through the faucet inlet. Depending on the actuation of the valve, the either filtered or unfiltered water is emitted through a faucet spout.

20 Claims, 9 Drawing Sheets

(51) Int. Cl.
- *B01D 35/143* (2006.01)
- *B01D 29/60* (2006.01)
- *G05D 7/06* (2006.01)
- *E03C 1/05* (2006.01)
- *C02F 1/00* (2006.01)

(52) U.S. Cl.
CPC ............ *B01D 35/147* (2013.01); *C02F 1/003* (2013.01); *E03C 1/055* (2013.01); *E03C 1/057* (2013.01); *G05D 7/0635* (2013.01); *C02F 1/008* (2013.01); *C02F 2201/005* (2013.01); *C02F 2209/008* (2013.01); *C02F 2301/043* (2013.01); *C02F 2307/06* (2013.01); *E03C 2201/40* (2013.01)

(58) Field of Classification Search
USPC .......................................................... 210/85
See application file for complete search history.

(56) References Cited

U.S. PATENT DOCUMENTS

| | | | |
|---|---|---|---|
| 4,556,484 A | 12/1985 | Hunter et al. | |
| 4,744,895 A | 5/1988 | Gales et al. | |
| 4,838,310 A | 6/1989 | Scott et al. | |
| 4,925,551 A | 5/1990 | Lipschultz et al. | |
| 5,095,945 A | 3/1992 | Jensen | |
| 5,173,178 A | 12/1992 | Kawashima et al. | |
| 5,318,070 A | 6/1994 | Surabian | |
| 5,714,066 A | 2/1998 | Jang | |
| 5,813,606 A | 9/1998 | Ziff | |
| 5,829,467 A | 11/1998 | Spicher | |
| 5,881,755 A | 3/1999 | Dieringer | |
| 6,001,244 A | 12/1999 | Salter et al. | |
| 6,358,395 B1 | 3/2002 | Schorzman et al. | |
| 6,797,156 B2 | 9/2004 | Chau | |
| 6,797,165 B2 | 9/2004 | Harrison | |
| 6,805,330 B2 | 10/2004 | Bush | |
| 6,909,101 B2 | 6/2005 | Nishioka | |
| 6,966,986 B1 | 11/2005 | Lackey | |
| 7,178,543 B2 | 2/2007 | Adams | |
| 7,204,930 B2 | 4/2007 | Nightingale | |
| 7,306,115 B2 | 12/2007 | Beachy | |
| 7,353,838 B2 | 4/2008 | Schmitt et al. | |
| 7,364,053 B2 | 4/2008 | Ophardt | |
| 7,364,651 B2 | 4/2008 | Baarman et al. | |
| 7,550,084 B2 | 6/2009 | Schmitt | |
| 7,743,788 B2 | 6/2010 | Schmitt et al. | |
| 7,837,866 B2 | 11/2010 | Burrows | |
| 7,900,650 B1 | 3/2011 | Wilson | |
| 8,162,236 B2 | 4/2012 | Rodenbeck et al. | |
| 8,180,489 B2 | 5/2012 | Quinn et al. | |
| 8,201,572 B2 | 6/2012 | Segal | |
| 8,308,942 B2 | 11/2012 | Swain | |
| 8,333,361 B2 | 12/2012 | McTargett | |
| 8,375,970 B2 | 2/2013 | Lautzenheiser et al. | |
| 8,443,825 B2 | 5/2013 | Lautzenheiser et al. | |
| 8,481,971 B2 | 7/2013 | Kim | |
| 8,857,466 B1 | 10/2014 | Wilson | |
| 9,009,883 B2 | 4/2015 | Chase et al. | |
| 9,114,365 B2 | 8/2015 | Schmitt | |
| 9,217,241 B2 | 12/2015 | Shaffer et al. | |
| 2003/0010721 A1 | 1/2003 | Aldred et al. | |
| 2003/0019764 A1 | 1/2003 | Baldwin et al. | |
| 2004/0097130 A1 | 5/2004 | Holliday | |
| 2004/0140435 A1 | 7/2004 | Nishioka | |
| 2005/0236594 A1 | 10/2005 | Lilly et al. | |
| 2007/0114290 A1* | 5/2007 | Kempf | E03B 7/045 236/12.13 |
| 2007/0199879 A1 | 8/2007 | Bors et al. | |
| 2007/0199886 A1 | 8/2007 | Korb et al. | |
| 2009/0000024 A1 | 1/2009 | Louis et al. | |
| 2009/0293819 A1 | 12/2009 | Weiss | |
| 2010/0065126 A1 | 3/2010 | Segal | |
| 2010/0193039 A1* | 8/2010 | Illingworth | E03C 1/04 137/112 |
| 2011/0233286 A1 | 9/2011 | Pasquesi | |
| 2012/0255619 A1 | 10/2012 | Librus et al. | |
| 2012/0318723 A1 | 12/2012 | Guess | |
| 2013/0112903 A1* | 5/2013 | Conan | E03C 1/052 251/129.15 |
| 2014/0061112 A1 | 3/2014 | Burd | |
| 2014/0116928 A1 | 5/2014 | Park et al. | |
| 2014/0151281 A1 | 6/2014 | Shaffer et al. | |
| 2014/0224351 A1 | 8/2014 | Gompper | |
| 2014/0352799 A1* | 12/2014 | Rosko | C02F 1/78 137/237 |
| 2015/0251922 A1 | 9/2015 | Schuster | |
| 2016/0052798 A1 | 2/2016 | Downs et al. | |
| 2016/0195882 A1 | 7/2016 | Rodenbeck et al. | |
| 2016/0340207 A1 | 11/2016 | Schuster | |

FOREIGN PATENT DOCUMENTS

| | | |
|---|---|---|
| CN | 205019825 U | 2/2016 |
| GB | 2276656 A | 10/1994 |
| IT | VR20100225 A1 | 5/2012 |
| JP | H05-187047 A | 7/1993 |
| JP | H06158693 A | 6/1994 |
| JP | H07171559 A | 7/1995 |
| JP | 2006-281164 | 10/2006 |
| JP | 2007-190524 A | 8/2007 |

OTHER PUBLICATIONS

"Scheda Tecnica AcquaClick," GEL (2014), pp. 1-3, retrieved from the Internet on Apr. 11, 2017 <http://www.demshop.it/image/data/FILTRI/gel-Acquaclick-scheda.pdf>.

European Office Action from corresponding European Patent Application No. 15180775.7, dated Apr. 28, 2017.

Chinese Office Action from corresponding Chinese Patent Application No. 201510232539.4, dated Apr. 25, 2019.

\* cited by examiner

REMOTE CONTROL FAUCET FILTER SYSTEM

BACKGROUND

The present invention relates generally to water filter systems, and in particular to such systems mounted in close proximity to conventional water faucets.

Water filter systems are known that are mounted to the outlet of a conventional faucet. A replaceable cartridge is enclosed within a housing mounted on the faucet spout as well. However, such systems are considered unsightly due to the large cartridge housing mounted to the faucet spout. Also, the capacity of the cartridges in such systems is relatively low, requiring frequent replacement.

Alternate water filter systems are known using under counter mounted cartridges. Such systems are more aesthetically pleasing, but also typically require a separate faucet. Many conventional sinks lack an access opening for mounting a separate faucet, and often consumers use an auxiliary sink opening for a soap dispenser. Thus, the mounting of such filter systems often involves the creation of a designated hole in the sink flange. Such openings are difficult to drill since the sink is made of stainless steel, or other material difficult to drill using conventional tools. Further, such systems are not appealing to consumers who just prefer to avoid installation of a separate faucet.

Other sink mounted filter systems require complicated plumbing in the faucet escutcheon plate, which is complicated to assemble, install and service.

Remote systems have been provided for controlling the flow of water supply to a residence, however such systems have required connection to the main electronic circuitry of the home.

Thus, there is a need for an improved water filter system that addresses the drawbacks of conventional systems listed above.

SUMMARY

The above-identified need is met by the present under counter water filter system, which features the ability for remote user control of the system without requiring installation and/or operation of a separate faucet in an existing sink. In addition, the present system is more conveniently installed, in that a control manifold is easily connected directly to the incoming water supply line and to a faucet inlet conduit using conventional threaded couplings. The manifold selectively connects a filter apparatus to the water supply line and ultimately to the faucet using an electronically controlled valve operated by a remotely located controller. Thus, the faucet spout emits either filtered or unfiltered water depending on the actuation of the remote controller. For convenience of the user, the remote controller is free of any structural connection to any of the manifold, the various lines or conduits, or the faucet. Another feature of the present system is that the controller is only activated once water is flowing through the manifold. In the preferred embodiment, the manifold is provided with displays for providing a user with system status information.

More specifically, a faucet filter system is connected to a water supply line, and includes a manifold configured for connection to the supply line and providing selective fluid communication with the supply line and a filter apparatus in fluid communication with the manifold. At least one remote actuated valve is associated with the manifold and is configured for controlling water flow in the manifold to the filter apparatus when filtered water is desired. A wireless controller is disposed remotely from the filter apparatus and the manifold and is configured for actuating the valve between a first position, in which water flows from the water supply conduit through a faucet inlet, and a second position, in which water flows from the water supply conduit, to the filter apparatus, through the filter outlet and through the faucet inlet. Depending on the actuation of the valve, the either filtered or unfiltered water is emitted through a faucet spout.

In another embodiment, a faucet filter system is provided for use with a sink-mounted faucet having separate hot and cold water supply conduits and connected to a water supply line. The system includes a manifold constructed and arranged for connection to a selected one of the cold and hot water supply conduits, providing selective fluid communication between the water supply line and a filter inlet, a filter apparatus in fluid communication with the manifold through the filter inlet and having a filter outlet in fluid communication with the faucet inlet conduit.

At least one remote actuated valve is associated with the manifold and is constructed and arranged for controlling water flow in the manifold to the filter apparatus when filtered water is desired. A wireless controller is disposed remotely from the filter apparatus and the manifold and is configured for actuating the valve between a first position, in which water flows from the water supply line through the faucet inlet, and a second position, in which water flows from the water supply line, to the filter apparatus, through the filter outlet and through the faucet inlet conduit. The system is configured such that depending on the actuation of the valve between the first and second positions, the faucet emits either filtered or unfiltered water through a faucet spout.

The manifold further includes a flow switch and is electronically connected to the controller so that the valve can be activated to the second position only when water is flowing through the manifold. In addition, the manifold includes a printed circuit board activated by the flow switch and connected to the valve for causing the valve actuation upon user actuation of a button on the controller. In one embodiment, the system is powered through at least one battery located in the controller, obviating the need for electrical connection to the residential electrical system.

DETAILED DESCRIPTION

Figure 1:
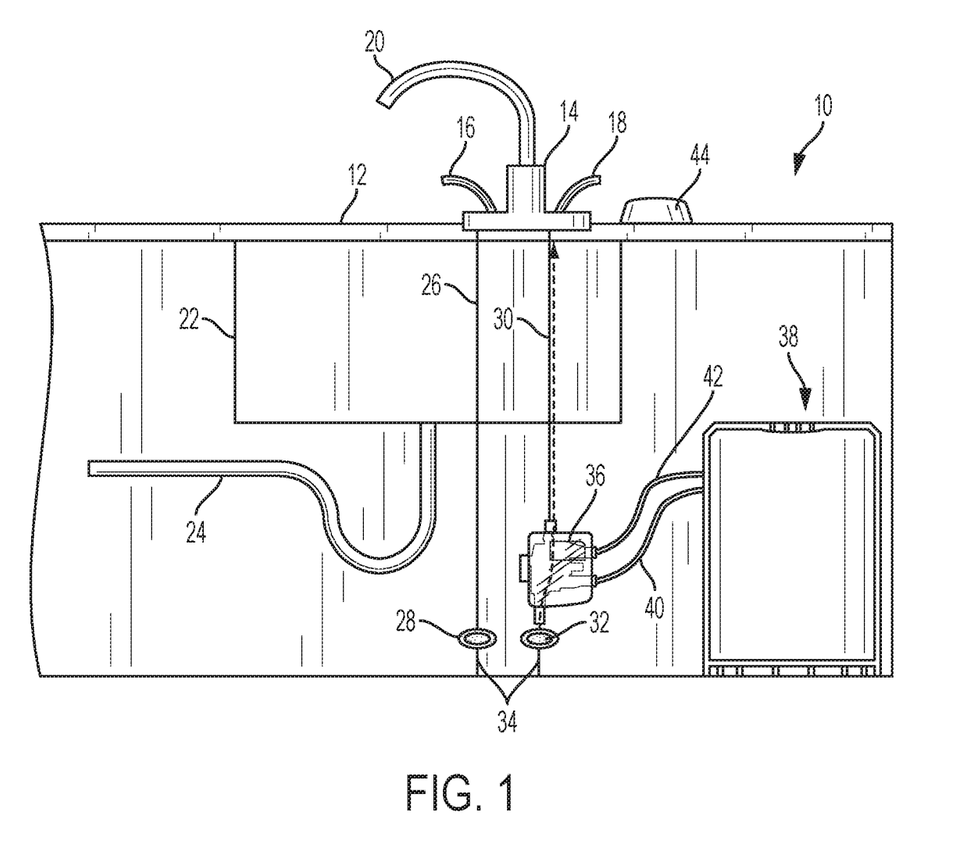
FIG. 1 is a schematic of the present remote control filter system shown mounted in a conventional residential sink application shown in a normal use position.
Figure 2:
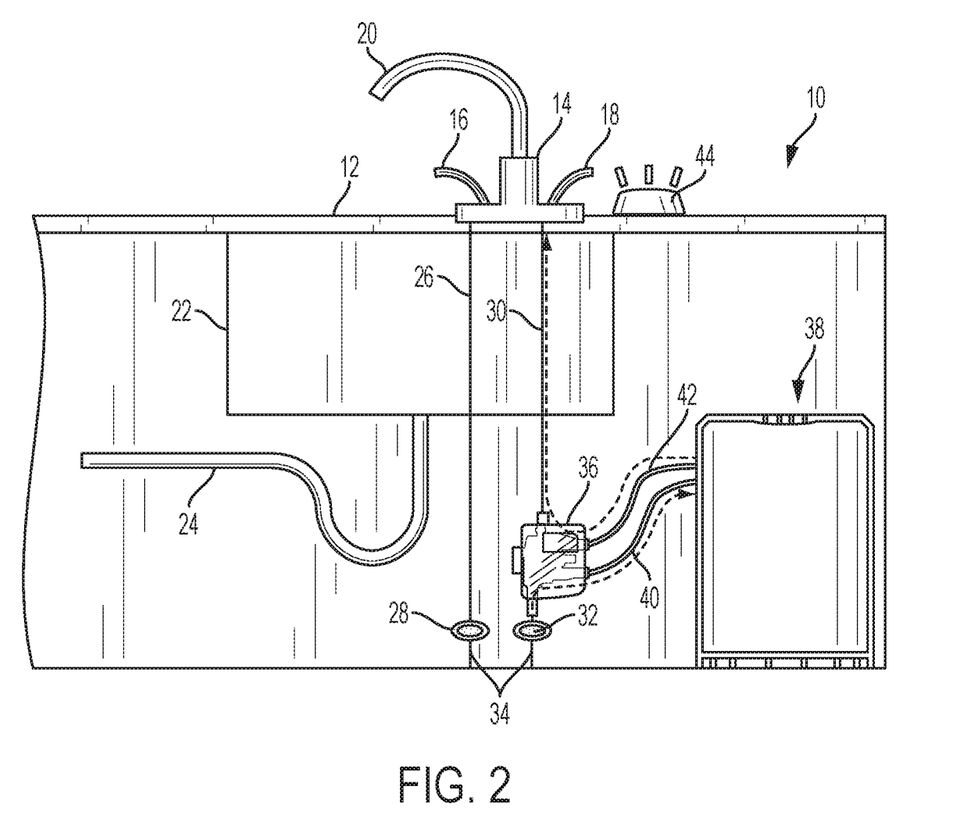
FIG. 2 is a schematic of the system of FIG. 1 shown in the filtering position.

Referring to FIGS. 1 and 2, the present remote control water filter system is generally designated 10, and is shown mounted beneath a conventional countertop 12, bearing a faucet 14 having hot and cold water controls 16, 18 respectively and a spout 20. In the present application, "water filter system" will be understood to refer to any known treatment system for improving the taste, purity or content of water supplied to a residence or commercial establishment. Water filter systems include, but are not limited to, carbon filters, RO systems, UV treatment systems, softeners, fiber filters, and the like. The faucet is shown mounted adjacent a sink 22 with a drain 24 as is well known in the art. A hot water supply conduit 26 is connected between the hot water control 16 and a shutoff valve 28, and a cold water supply conduit 30 is connected between the cold water control 18 and a corresponding cold water shutoff valve 32. Both valves 28, 32 are connected to a corresponding water supply line 34 as is known in the art.

The present remote control water filter system 10 includes a control manifold 36 connected between one of the hot and the cold water shutoff valves 28, 32 and the corresponding water supply conduit 26, 30. Preferably, the manifold 36 is connected to the cold water system and the manifold is in fluid communication with the cold water supply line, 30 also referred to as the faucet inlet conduit. In the present application, "manifold" will be understood to refer to any type of fluid connector having a diverter feature, including but not limited to unitary housings (as depicted here) as well as independent valves and separate components plumbed together with tubing, piping or other flow conduits. As described in greater detail below, this connection is preferably made using conventional threaded fittings for ease of assembly by a user, such as a homeowner. Also included in the system 10 is a filter apparatus generally designated 38, which is also preferably located beneath the countertop 12. For the purposes of this application, the filter apparatus 38, similar to the water filter system described above, is contemplated as any sort of conventional potable water treatment apparatus, including but not limited to granulated carbon filters, RO systems, UV treatment system, and the like.

The filter apparatus 38 is in fluid communication with the manifold 36 by a fluid inlet line 40 and a fluid outlet line 42. As is known in the art, the lines 40, 42 are contemplated as being flexible tubing made of material suitable for carrying treated drinking water. A remote controller 44 is shown disposed on the counter top 12 in close proximity to the faucet 14. However, it will be understood that the controller 44 is not structurally connected to either the faucet 14, the manifold 36, the filter apparatus 38 or any of the corresponding lines or conduits. Instead, the controller 44 controls the system 10 wirelessly, preferably by RF signals as described in greater detail below.

An important feature of the present system 10 is that the remote controller 44 controls components of the manifold 36 so that the manifold provides selective fluid communication between the water supply line 34 and the filter inlet 40. In other words, actuation of the controller 44 provides the user with the ability to determine whether unfiltered or filtered water is dispensed through the faucet spout 20. In FIG. 1, a standard flow path is depicted in dashed lines, in which potable water flows through the manifold 36, through the faucet inlet conduit 30 and to the faucet 14. In FIG. 2, the controller 44 is activated by the user and causes an internal valve in the manifold 36 to close, directing flow from the supply line through the filter apparatus 38, then back to the manifold and ultimately to the faucet 14, and out the spout 20.

Figure 3:
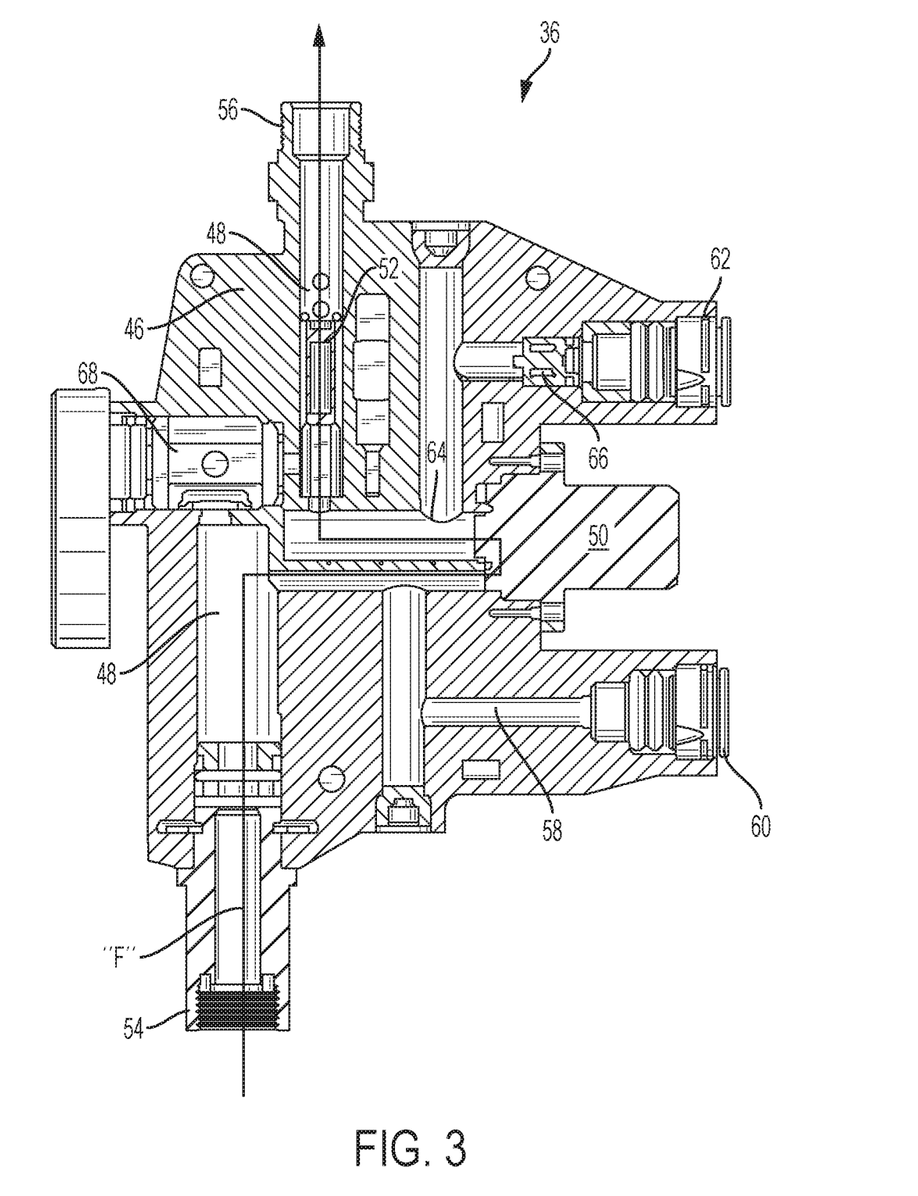
FIG. 3 is a vertical cross-section of the present system manifold shown in the normal flow position.
Figure 4:
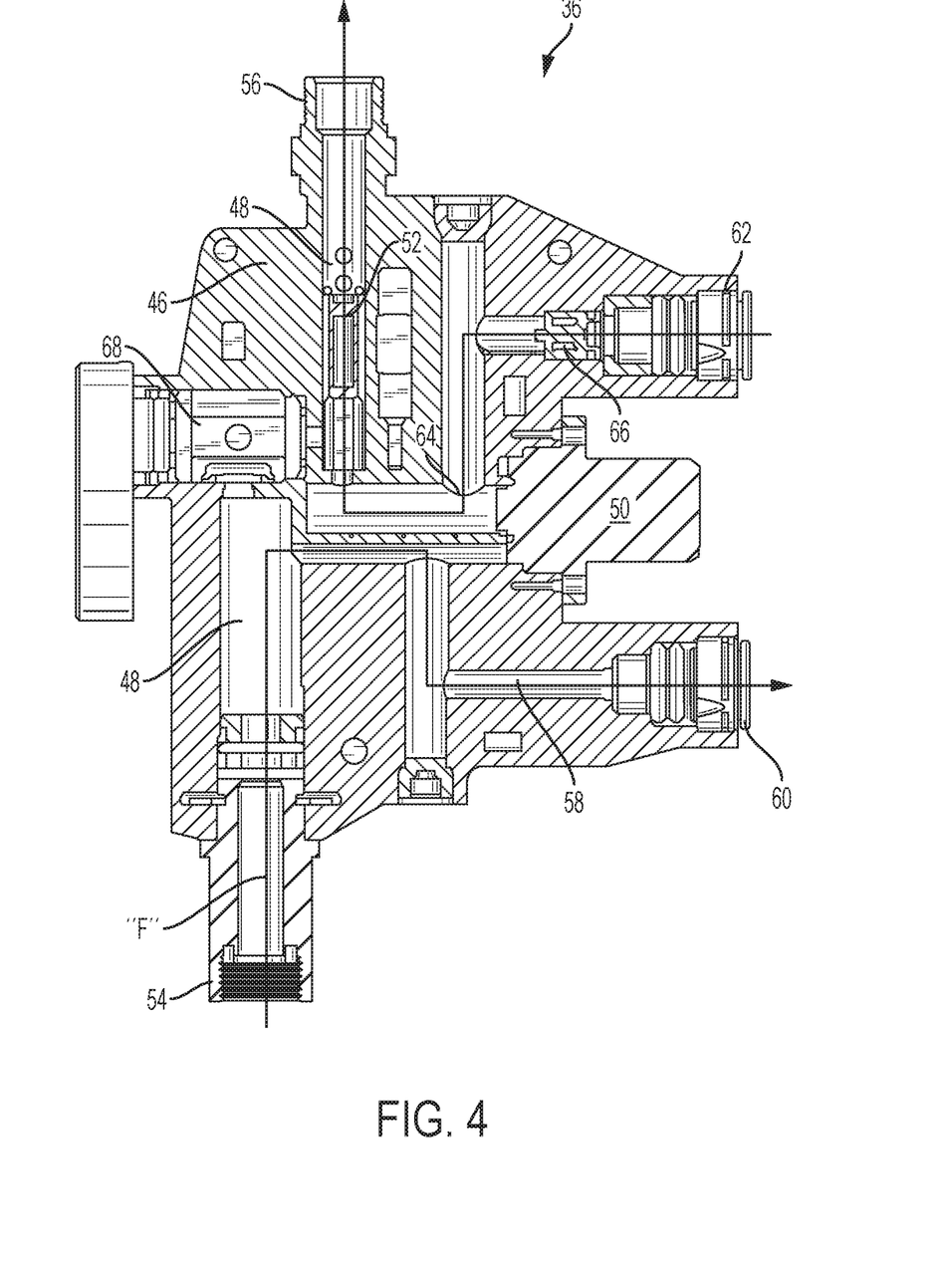
FIG. 4 is a vertical cross-section of the present system manifold shown in the filtering position.
Figure 5:
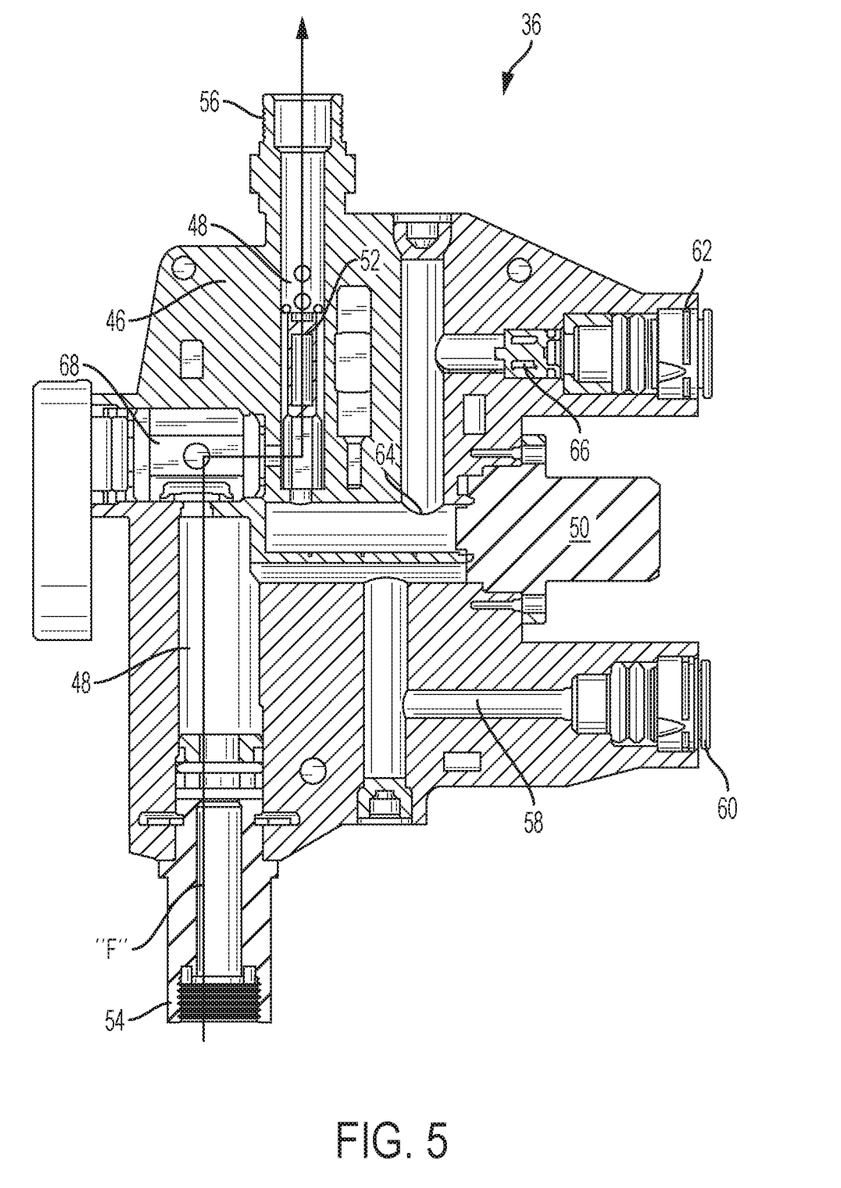
FIG. 5 is a vertical cross-section of the present system manifold shown in the bypass position.
Figure 6:
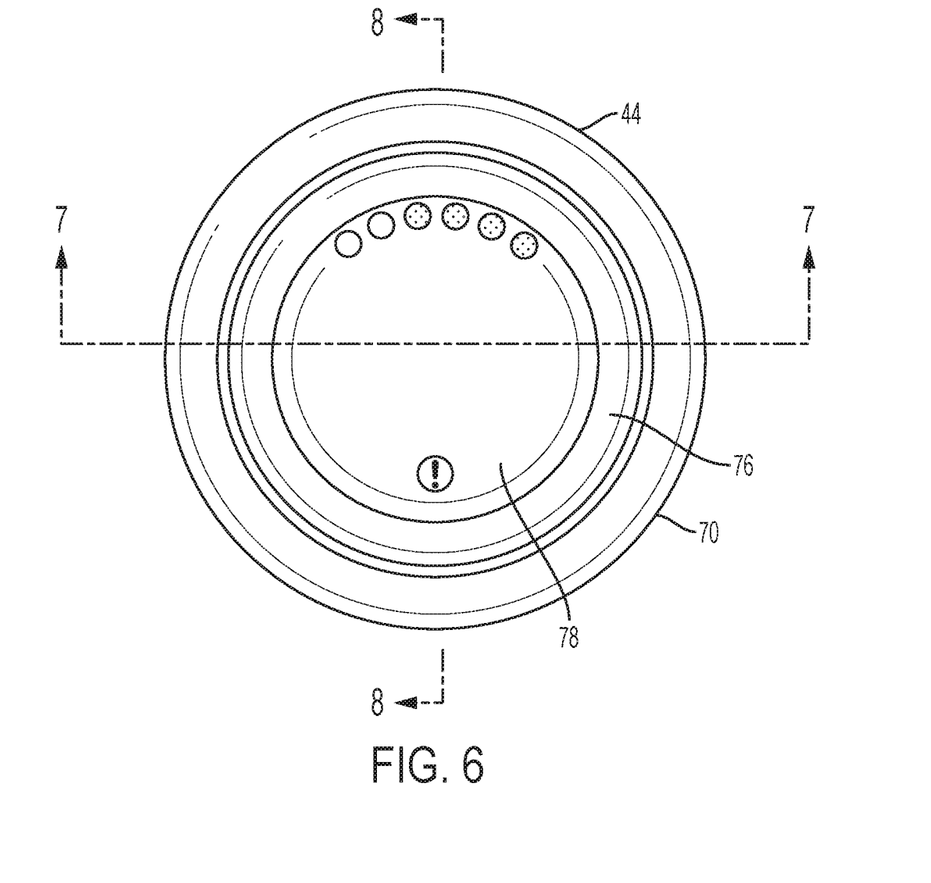
FIG. 6 is a plan view of the present remote control activator.
Figure 7:
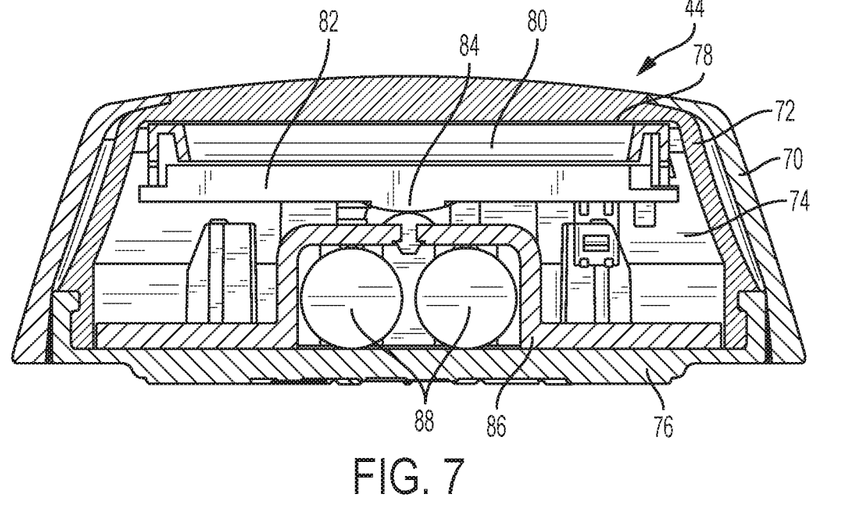
FIG. 7 is a cross-section taken along the line 7-7 of FIG. 6 and in the direction generally indicated.
Figure 8:
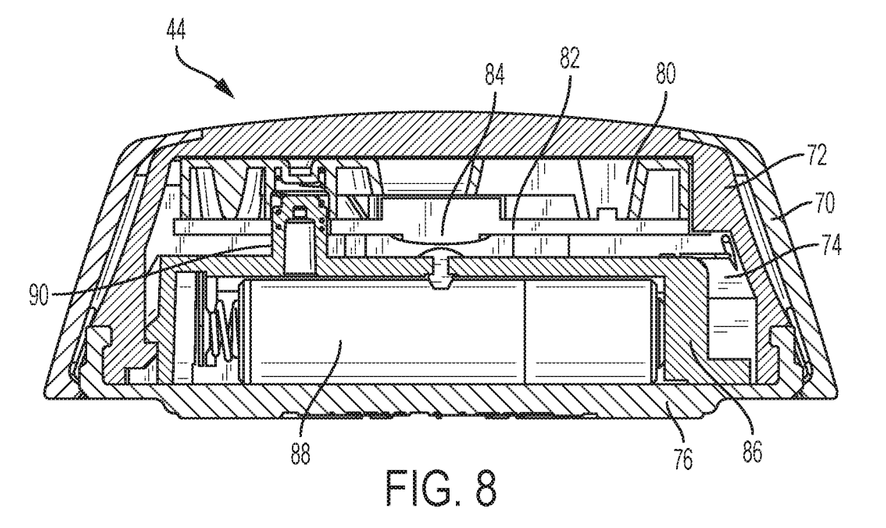
FIG. 8 is a cross-section taken along the line 8-8 of FIG. 6 and in the direction generally indicated.
Figure 9:
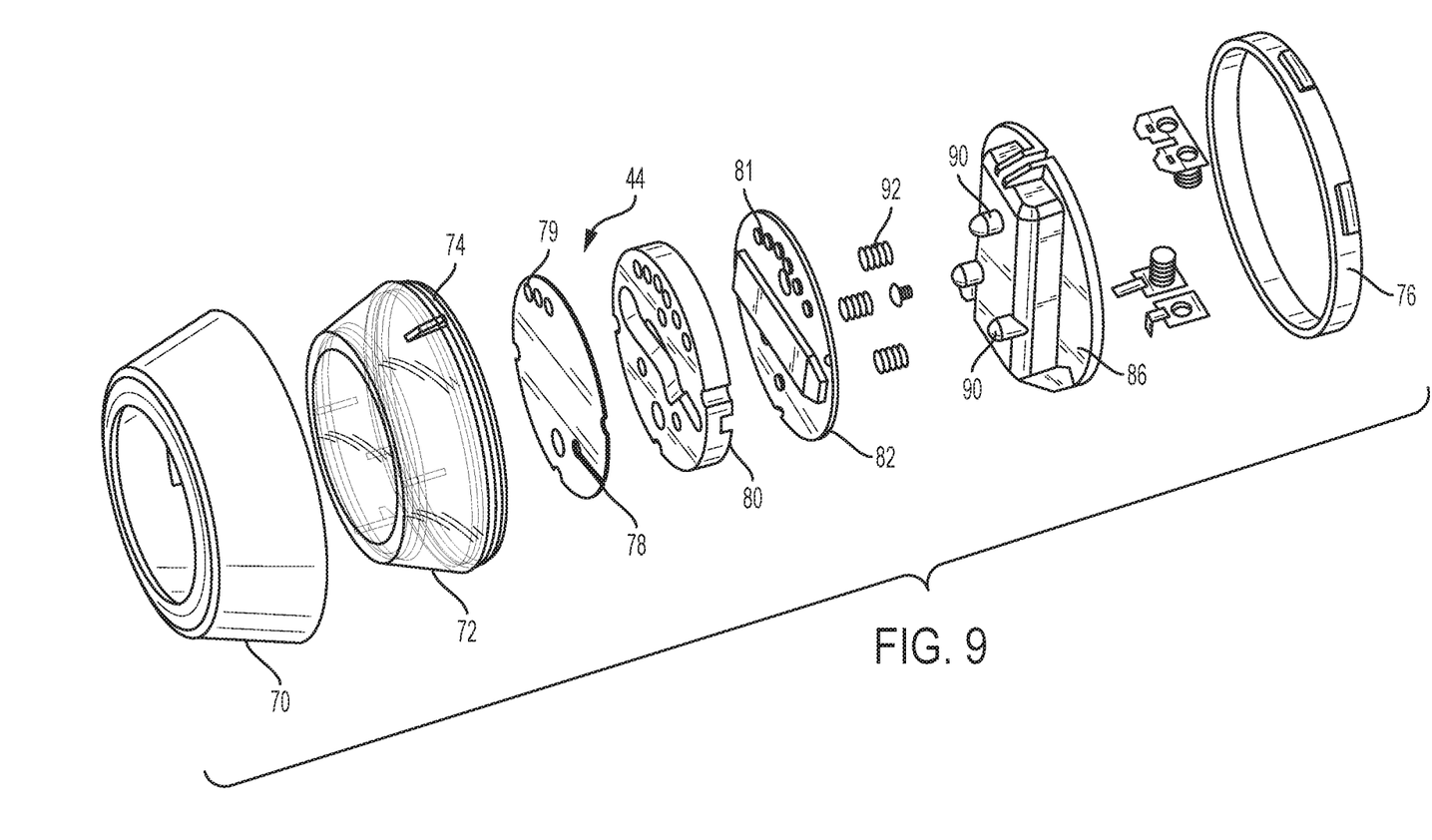
FIG. 9 is an exploded perspective view of the present remote control activator.

Referring now to FIGS. 3-5, construction of the control manifold 36 is shown in greater detail. A main manifold housing 46 defines a first passageway 48 for providing fluid communication between the water supply line 34 and the faucet inlet conduit 30, thus bypassing the filter apparatus 38. At least one remote actuated or controlled valve 50, preferably an electronic solenoid valve or the like, is associated with the manifold 36 and is placed in fluid communication with the first passageway 48 in a first or open position as seen in FIG. 3. As described in further detail below, each valve 50 is constructed and arranged for controlling, preferably by diverting, water flow in the manifold 36 to flow to the filter apparatus 38 when filtered water is desired.

Thus, in a default operational condition, untreated potable water flows as depicted in line "F" from the water supply line 34, through the shutoff valve 32 and into the first passageway 48. A flow switch 52 is disposed in the first passageway 48 downstream of the valve 50 and is electronically connected to the controller 44 so that the valve can be activated to a second, closed position only when water is flowing through the first passageway and out the manifold 36 towards the faucet 14. In the present application, "flow switch" will be understood to refer to any type of flow sensing device that sends an electrical signal upon sensing fluid flow, including but not limited to magnetic switches, turbines, pressure transducers and the like. While other switches are contemplated, as known in the art, the present flow switch 52 is a 0.5 gpm model having a magnet inside the manifold 36 and a reed switch external to the manifold for detecting when the faucet 14 is open and water is flowing from the spout 20.

At each end of the first passageway 48 the module housing 46 is provided with a coupling for easy connection of the present system 10 into an existing water supply system. In the preferred embodiment, the couplings are threaded and compatible with existing conventional water supply plumbing connections, however other connections are contemplated, including push on, bayonet couplings, and other equivalent connection technologies. A first or water supply coupling 54 is preferably the female threaded type for engagement upon a nipple of the shutoff valve 32. At the other end of the passageway 48, a second coupling 56, is preferably a male threaded type for connection to the faucet inlet conduit 30, commonly a standard fitting found in most hardware and home repair stores. Another feature of the present system 10 is that the couplings 54, 56 form the sole fluid connection between the manifold 36 and the faucet 14. In addition, the couplings 54, 56, and particularly the coupling 54 is the sole structural support for the control manifold 36 in the system 10. Referring now to FIG. 4, upon the valve 50 being activated by the controller 44, the valve is moved to a second or closed position in which water flows from the first coupling 54 into a second passageway 58 in the manifold 36 for providing fluid communication between the water supply conduit and the filter apparatus 38. More specifically, the second passageway 58 includes a coupling 60 configured for connection to an end of the filter inlet line 40, and a coupling 62 configured for connection to an end of the filter outlet line 42. The second coupling 62 is then connected to a third passageway 64 which directs filtered water into the first passageway 48 past the flow switch 52 the faucet inlet 30 and ultimately to the faucet 14. In the preferred embodiment, a check valve 66 is connected in the third passageway 64 between the coupling 62 and the flow switch 52 to prevent flow of untreated water back into the filter apparatus 38. While the check valve 66 is shown as part of the control manifold 36, it will be understood that it may be separately plumbed into the water flow path, or located elsewhere in the system 10, as long as the above-described function is achieved. Thus, depending on the position of the valve 50 between the first and second positions, the system 10 is configured such that the faucet 14 emits either filtered or unfiltered water through the faucet spout 20 through the same flow path. Thus, the same spout 20 emits either filtered or unfiltered water, depending on the position of the valve 50.

Referring now to FIG. 5, in the event the solenoid valve 50 malfunctions and remains in the closed or second position of FIG. 4, the user has the option of actuating a manual bypass to effect fluid flow through the first passageway 48. A supplemental manual bypass valve 68 is connected to the first passageway 48, and when opened, creates a flow path past the valve 50 and to the faucet inlet 30.

Referring now to FIGS. 6-9, the controller 44 is described in greater detail. A frusto-conical controller trim ring 70 is optional and snap fits to similarly shaped housing 72 that defines an inner chamber 74. The housing is snap fit to a flexible base 76 that seals the chamber 74 from the entry of unwanted moisture. A cover disk 78 is relatively rigid, has at least one indicator opening 79 constructed and arranged to transmit light passing through a light divider 80 that receives light from a series of indicator LED's 81 located on a printed circuit board 82. The light divider 80 controls the lateral projection of light so that individual LED's 81 are more easily read by the user. Also located on the circuit board 82 is an RF transmitter component, well known in the art, and a push-button switch 84 that engages a battery housing 86. The battery housing 86 is constructed and arranged to house at least one and preferably two replaceable or rechargeable batteries 88 for powering the system 10. A plurality of bosses 90 project vertically from the housing 86 towards the circuit board 82 and provide locating points for biasing elements 92, preferably coiled springs or the like.

As the user presses on the controller housing 72, the disk 78, the light divider 80 and the printed circuit board 82 move reciprocally as a unit against the force of the biasing elements 92, as well as relative to the base 76 and cause the switch 84 to close against the battery housing 86. Once the switch 84 is closed, an RF signal is sent to the manifold 36 to move the valve 50 to the second position and permit water to flow through the filter apparatus 38, and ultimately to the faucet spout 20. While a particular, preferred remote controller 44 is described here, it will be understood that the remote controller 44 can be provided in other embodiments that function by user-initiated control over the generation of a signal for controlling the valve 50. Such alternative controllers include, but are not limited to mobile phones or other mobile computers with wireless capability, whether or not hand-held, voice-activated devices, motion-activated devices, optical sensors, capacitive sensing devices, and similar technologies.

Figure 10:
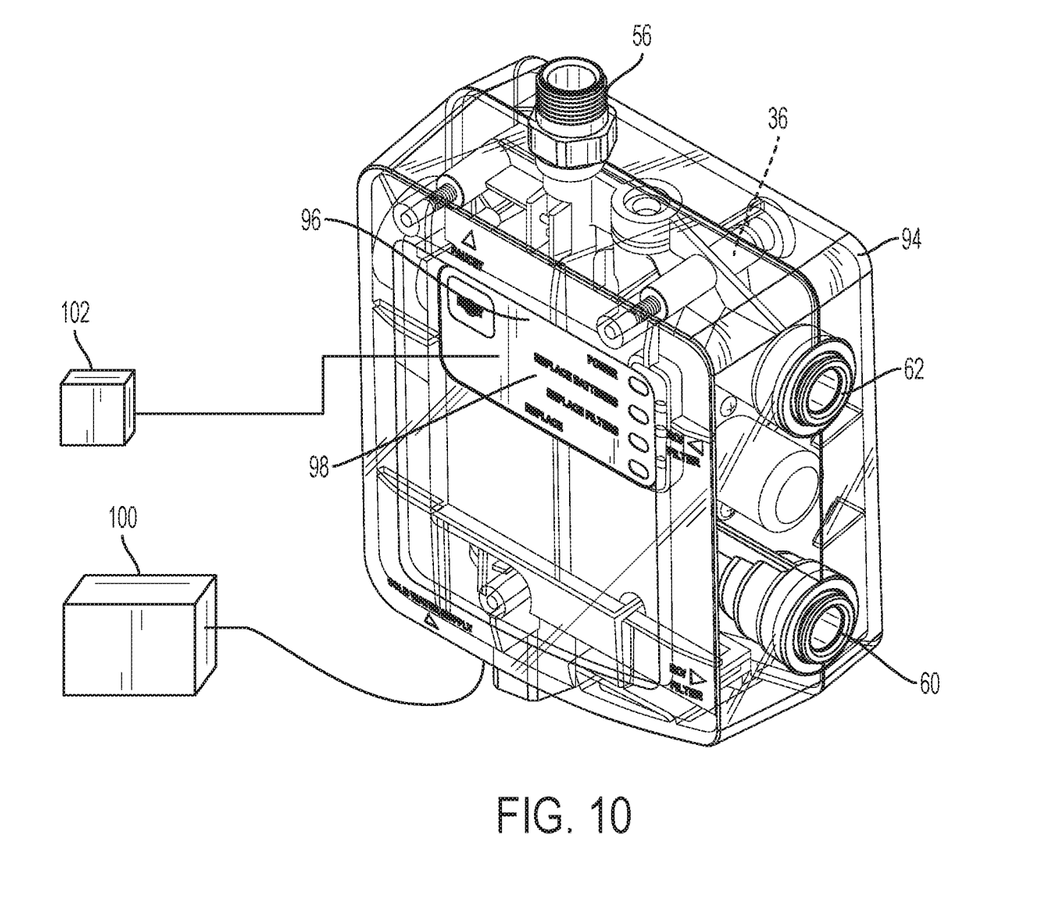
FIG. 10 is a top perspective view of the manifold.

Referring now to FIG. 10, the manifold 36 is preferably enclosed in a case 94 provided with a second printed circuit board 96 and a status display board 98. The status parameters include, but are not limited to, filter life, error, signals, normal operational status, and the like. It is contemplated that the circuit board 96 and the valve 50 are powered by a designated power source 100, such as a battery pack, however the use of household current through a conventional wall socket is also contemplated. The circuit board 96 incorporates a valve controller shown schematically at 102. The circuit board 96, and more specifically the valve controller 102 is activated by the flow switch 52 and is connected to the valve 50 for enabling valve energization upon user actuation of the button 78 on the controller 44. The system 10 is configured so that the valve 50 is moved back to the first, default position of FIG. 3 from the second position upon a user again activating the controller 44, or upon water flow being turned off at the faucet 14.

While a particular embodiment of the present remote control faucet filter system has been shown and described, it will be appreciated by those skilled in the art that changes and modifications may be made thereto without departing from the invention in its broader aspects and as set forth in the following claims.

What is claimed:
1. A faucet filter system for use with a sink-mounted faucet connected to a water supply line, said system comprising:
   a unitary manifold constructed and arranged for connection to the supply line and for providing selective fluid communication with the water supply line and a filter apparatus, the unitary manifold arranged such that all incoming water from an incoming water shutoff valve, connected to the water supply line, flows through the manifold before reaching a water control of the sink mounted faucet;
   said filter apparatus being in fluid communication with said manifold where said filter apparatus is isolated from, but fluidly connected to said manifold through said filter inlet and said filter outlet;
   a manifold housing, of said manifold, defining:
      a first passageway for providing fluid communication between the water supply line and the faucet inlet conduit;
      a second passageway for providing fluid communication between the water supply line and said filter apparatus through said filter inlet, and
      a third passageway connecting said filter outlet with said faucet inlet conduit;
   a single remote actuated valve mounted to said manifold including:
      a first position, such that water flows through said first passageway, through said remote actuated valve, directly to the faucet inlet conduit; and
      a second position such that water flows through said water supply line through said second passageway, said filter inlet, said filter apparatus, said filter outlet, said third passageway, and to the faucet inlet conduit,
   said manifold housing having a threaded water supply coupling which is the sole structural support for the manifold housing; and
   a wireless controller, disposed remotely from said filter apparatus and said manifold, configured for actuating said remote actuated valve between said first position and said second position;
   said system being configured such that depending on the actuation of said remote actuated valve, between said first and second positions, the faucet emits either filtered or unfiltered water through a faucet spout.
2. The system of claim 1 wherein the faucet emits either filtered or unfiltered water through a common pathway in said faucet spout.
3. The system of claim 1, further including a check valve in fluid communication with said filter outlet and configured for preventing flow of water back into said filter apparatus.

4. The system of claim 1, wherein said wireless controller is free of structural connection to said manifold, said conduits, said filter or to said faucet.

5. The system of claim 1, wherein said manifold housing includes a water supply coupling configured for threaded connection to said incoming water shutoff valve, and a faucet coupling configured for threaded connection between said first passageway and said faucet inlet conduit.

6. The system of claim 5, wherein said couplings form a sole connection between said manifold housing and the faucet and/or said water supply line.

7. The system of claim 1, wherein said valve is a remote controlled solenoid valve.

8. The system of claim 1, wherein said controller includes at least one battery for powering said system.

9. The system of claim 1, wherein said controller includes a biased button operating an on-off switch movable with said button so that depression of the button activates said switch for controlling said valve.

10. The system of claim 9, wherein said on-off switch is connected to a printed circuit board which is connected to said button for common movement.

11. The system of claim 10, wherein said controller includes a battery housing located within an internal chamber defined by a controller housing, and said button and said switch reciprocate relative to said battery housing.

12. A faucet filter system for use with a sink-mounted faucet having separate hot and cold water supply conduits and connected to a water supply line, said system comprising:
a unitary manifold constructed and arranged for connection to a selected one of the cold and hot water supply conduits, providing selective fluid communication between the water supply line and a filter apparatus, the unitary manifold arranged such that all incoming water from an incoming water shutoff valve, connected to the water supply line, flows through the manifold before reaching a water control of the sink mounted faucet;
said filter apparatus in fluid communication with said manifold where said filter apparatus is isolated from, but fluidly connected to said manifold through said filter inlet and said filter outlet;
a manifold housing, of said manifold, defining:
a first passageway for providing fluid communication between the water supply line and the faucet inlet conduit, and
a second passageway for providing fluid communication between the water supply line and said filter apparatus through said filter inlet
a single remote actuated valve mounted to said manifold including:
a first position, such that water flows through said first passageway and said remote actuated valve directly to said faucet inlet conduit, and
a second position such that water flows through said second passageway to said filter inlet, through said filter, through said filter outlet, and to said faucet inlet conduit,
a wireless controller disposed remotely from said filter apparatus and said manifold and configured for actuating said remote actuated valve between a first position and a second position;
said system being configured such that depending on the actuation of said remote actuated valve, between said first and second positions, the faucet emits either filtered or unfiltered water through a faucet spout;
said manifold further includes a single flow switch mounted in said first passageway of said manifold and associated said manifold housing and is electronically connected to said controller so that said remote actuated valve can be activated to said second position only when water is flowing through said manifold, said remote actuated valve is moved to said first position from said second position upon user activation of said controller or upon water flow being turned off at the faucet;
said manifold housing having a threaded water supply coupling; and
said manifold further includes a printed circuit board mounted on said manifold housing and activated by said flow switch and electronically connected to said remote actuated valve for causing said valve actuation upon user actuation of a button on said controller.

13. The system of claim 12, wherein said flow switch is located in said first passageway so that said remote actuated valve is activated only upon water flowing in said first passageway.

14. The system of claim 12, wherein at least one of said wireless controller and said printed circuit board on said manifold includes user displays of system status.

15. A faucet filter system for use with a sink-mounted faucet connected to a water supply line, said system comprising:
a unitary manifold having a manifold housing constructed and arranged for connection to the water supply line and for providing selective fluid communication with the water supply line and a filter apparatus, the unitary manifold arranged such that all incoming water from an incoming water shutoff valve, connected to the water supply line, flows through the manifold before reaching a water control of the sink mounted faucet;
said filter apparatus in fluid communication with said manifold where said filter apparatus is isolated from but fluidly connected to said manifold through said filter inlet and said filter outlet;
said manifold housing further includes a manual bypass valve for user actuation for selectively controlling flow between the water supply line and said faucet inlet conduit for causing the water flow to bypass said filter apparatus;
a check valve in fluid communication with said filter outlet and configured for preventing flow of water back into said filter apparatus;
a wireless controller disposed remotely from the faucet, said filter apparatus and said manifold and configured for actuating said remote actuated valve between a first position, in which water flows from the water supply line through the faucet inlet conduit, and a second position, in which water flows from the water supply line, through said filter inlet, to said filter apparatus, through said filter outlet, and through said faucet inlet conduit;
said system being configured such that depending on the actuation of said remote actuated valve, between said first and second positions, the faucet emits either filtered or unfiltered water through a faucet spout; and
said manifold includes a water supply coupling configured for threaded connection to a water supply shutoff valve, and a faucet coupling configured for threaded connection between said first passageway and said faucet inlet conduit.

16. The system of claim 1, wherein said manifold further including a manual bypass valve for user actuation for selectively controlling flow between the water supply line and said faucet inlet conduit for causing the water flow to bypass said filter apparatus.

17. The system of claim 1, wherein said manifold further includes a flow switch mounted in said first passageway of said manifold and associated with said manifold housing and electronically connected to said controller so that said solenoid can be activated to said second position only when water is flowing through said first passageway.

18. The system of claim 1, wherein the threaded water supply coupling is a threaded connection between a faucet shutoff valve connected to the water supply line and a faucet inlet conduit have the water flow control.

19. The system of claim 1, wherein said manifold further including a manual bypass valve for user actuation for selectively controlling flow between the water supply line and said faucet inlet conduit for causing the water flow to bypass said filter apparatus.

20. The system of claim 1, wherein said manifold further includes a flow switch mounted in said first passageway of said manifold and associated with said manifold housing and electronically connected to said controller so that said solenoid can be activated to said second position only when water is flowing through said first passageway.

* * * * *